United States Patent
Lundqvist et al.

(10) Patent No.: US 8,995,276 B2
(45) Date of Patent: Mar. 31, 2015

(54) METHOD AND AN ARRANGEMENT IN A FIRST NETWORK NODE FOR MANAGING CONGESTION

(75) Inventors: Ola Lundqvist, Karlstad (SE); Oleg Klimin, Bor (RU); Kirill Shmelev, Kstovo (RU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 106 days.

(21) Appl. No.: 13/640,786

(22) PCT Filed: Apr. 13, 2010

(86) PCT No.: PCT/EP2010/054838
§ 371 (c)(1),
(2), (4) Date: Oct. 12, 2012

(87) PCT Pub. No.: WO2011/127965
PCT Pub. Date: Oct. 20, 2011

(65) Prior Publication Data
US 2013/0039174 A1    Feb. 14, 2013

(51) Int. Cl.
*H04L 12/26* (2006.01)
*H04Q 3/00* (2006.01)

(52) U.S. Cl.
CPC .......... *H04Q 3/0025* (2013.01); *H04Q 3/0091* (2013.01); *H04Q 2213/13107* (2013.01); *H04Q 2213/13162* (2013.01); *H04Q 2213/13163* (2013.01); *H04Q 2213/13164* (2013.01); *H04Q 2213/13166* (2013.01); *H04Q 2213/13175* (2013.01); *H04Q 2213/13176* (2013.01); *H04Q 2213/13204* (2013.01)
USPC .......................................................... 370/236

(58) Field of Classification Search
USPC ......... 370/229, 235, 236, 410, 426, 465, 469, 370/496
See application file for complete search history.

(56) References Cited

U.S. PATENT DOCUMENTS

| 7,006,433 | B1 | 2/2006 | Dantu et al. | |
|---|---|---|---|---|
| 7,477,646 | B1 * | 1/2009 | Peterson et al. | 370/401 |
| 2001/0033549 | A1 | 10/2001 | Yi | |
| 2007/0297336 | A1 * | 12/2007 | Pitcher et al. | 370/236 |

FOREIGN PATENT DOCUMENTS

| EP | 1565001 A1 | 8/2005 |
|---|---|---|
| WO | 2007146079 A2 | 12/2007 |
| WO | 2009129835 A1 | 10/2009 |

\* cited by examiner

*Primary Examiner* — Frank Duong
(74) *Attorney, Agent, or Firm* — Rothwell, Figg, Ernst & Manbeck P.C.

(57) ABSTRACT

A method and an arrangement (400) for managing congestion of outgoing data of at least one link in a telecommunications signalling network protocol stack, comprising a first and second layer and an interface there-between, are provided. The first network node comprises multiple processing modules (430). The first network node (110) determines (210) a congestion level between the first and second layers. The first network node (110) receives (220), from the first layer, any existing first layer congestion level indication, indicating congestion between the first layer of the first network node and the first layer of the second network node. The first network node (110) generates (230) a simulated first layer congestion level indication based on the determined congestion level. The first network node (110) generates (240) a total first layer congestion level indication based on the simulated first layer congestion level indication and said any existing first layer congestion level indication.

18 Claims, 4 Drawing Sheets

METHOD AND AN ARRANGEMENT IN A FIRST NETWORK NODE FOR MANAGING CONGESTION

CROSS-REFERENCE TO RELATED APPLICATION

This application is a 35 U.S.C. §371 National Phase Entry Application from PCT/EP2010/054838, filed Apr. 13, 2010, and designating the United States, the disclosure of which is incorporated by reference herein.

TECHNICAL FIELD

The present invention relates to a method and an arrangement in a first network node for managing congestion of outgoing data of at least one link in a telecommunications signalling network protocol stack.

BACKGROUND

In a SS7 and/or SIGTRAN system, congestion and Send Failure Notification have been implemented. Congestion or send failure appears when the peer do not acknowledge messages fast enough compared to the traffic rate in the interface between the peer node and the layer 2 instance on the local node. This means that in case the traffic rate is too high compared to the throughput of the interface between peer's layer 2 instances, a congestion indication or a send failure notification will be sent by the local layer 2 instance to the local layer 3 instance to indicate that there is an congestion situation, or overload situation. This indication is then forwarded to the client on top of layer 3 or forwarded to other nodes in case the local node acts as a gateway.

The mechanism to detect an overload situation in the interface between layer 2 and layer 3 for the incoming direction is known from the above mentioned systems.

Layer 3, for example M3UA, buffers data when it receives a Send Failure Notification (SFN) in existing implementations of SS7 network protocol stacks.

Presently, flow control for outgoing SS7 traffic is handled by the use of process priorities. The clients have had lower priority, thereby making it impossible to load the interface between layer 2 and layer 3 higher than the processing unit can manage.

As a result of the introduction of multi core processors in CPP (Connectivity Packet Platform), present solutions for flow control need to be improved. The process priorities are effectively disabled by the multi core environment. Due to this there is a need to implement a flow control function to make sure that the system is not overloaded by messages. The overload can cause various problems like lost data or crashing processes.

SUMMARY

An object of the present invention is to manage congestion (or overload) of outgoing data of at least one link in a telecommunications signalling network protocol stack, wherein the telecommunications signalling network protocol stack is implemented in a network node comprising multiple processing modules.

According to an aspect of the invention, the object is achieved by a method in a first network node for managing congestion of outgoing data of at least one link in a telecommunications signalling network protocol stack, comprising a first and a second layer and an interface therebetween. Each said at least one link interconnects the first network node and a second network node. The first network node comprises multiple processing modules. A communication network comprises the first and second network nodes. First layer congestion level indication is based on congestion between the first layer of the first network node and the first layer of the second network node. In a step, the network node determines a congestion level between the first and second layers. In another step, the network node receives, from the first layer, any existing first layer congestion level indication, indicating congestion between the first layer of the first network node and the first layer of the second network node. In a further step, the network node generates a simulated first layer congestion level indication based on the determined congestion level between the first and second layers. In yet another step, the network node generates a total first layer congestion level indication based on the simulated first layer congestion level indication and said any existing first layer congestion level indication.

According to a further aspect of the invention, the object is achieved by an arrangement in a first network node for managing congestion of outgoing data of at least one link in a telecommunications signalling network protocol stack, comprising a first and a second layer and an interface therebetween. Each said at least one link interconnects the first network node and a second network node. The first network node comprises multiple processing modules. A communication network comprises the first and second network nodes. First layer congestion level indication is based on congestion between the first layer of the first network node and the first layer of the second network node. Further, at least one of said multiple processing modules is configured to determine a congestion level between the first and second layers. The arrangement further comprises a receiving unit configured to receive, from the first layer, any existing first layer congestion level indication, indicating congestion between the first layer of the first network node and the first layer of the second network node. Moreover, said at least one of said multiple processing modules is configured to generate a simulated first layer congestion level indication based on the determined congestion level between the first and the second layer, and to generate a total first layer congestion level indication based on the simulated first layer congestion level indication and said any existing first layer congestion level indication.

An idea of the present invention is to generate the total first layer congestion level indication based on the simulated first layer congestion level indication and said any existing first layer congestion level indication. Then, the generated total first layer congestion level indication is sent from the interface to the second layer. As a result, the above mentioned object is achieved.

Advantageously, flow of outgoing data can be controlled without any modification to the first and second layers. In this manner, implementation at a low cost is facilitated.

It is to be understood that the expression "multiple processing modules", includes, but is not limited to, a plurality of processing units, such as CPUs or the like, or one single processing unit comprising a plurality of processing cores, commonly referred to as a multi-core processor.

Further features of, and advantages with, the present invention will become apparent when studying the appended claims and the following description. It is to be understood that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
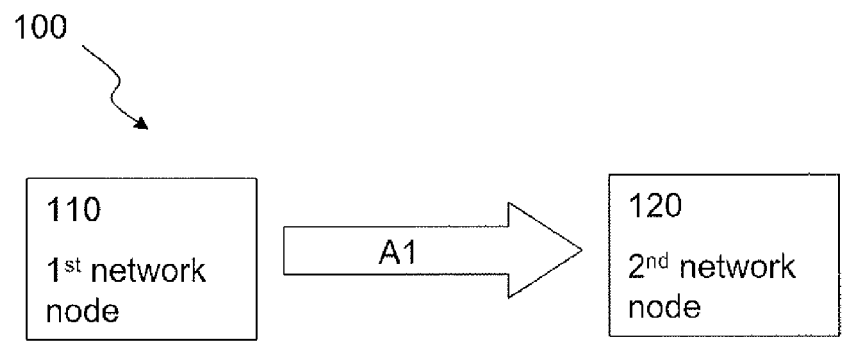
FIG. 1 shows a schematic overview of a communication network, to which the present invention may be applied.

Throughout the following description similar reference numerals have been used to denote similar elements, parts, items or features, when applicable.

FIG. 1 shows a schematic overview of a communication network 100, to which the present invention may be applied. The communication network 100 comprises a first network node 110 and a second network node 120. The first network node 110 may, for example, be a Media Gateway (MGW), a radio network controller (RNC), base station controller (BSC) and the like. Likewise, the second network node 110 may, for example, be a Media Gateway (MGW), a radio network controller (RNC), base station controller (BSC), a Serving GPRS Support Node (SGSN) and the like. An arrow A1 indicates that at least one link (or sometimes referred to as association) interconnects the first network node 110 and the second network node 120. The direction of the arrow indicates that said at least one link is associated with at least outgoing data (or outgoing traffic) in respect of the first network node 110. Possibly, said at least one link is also associated with incoming data (or incoming traffic) in respect of the first network node 110.

Figure 2:
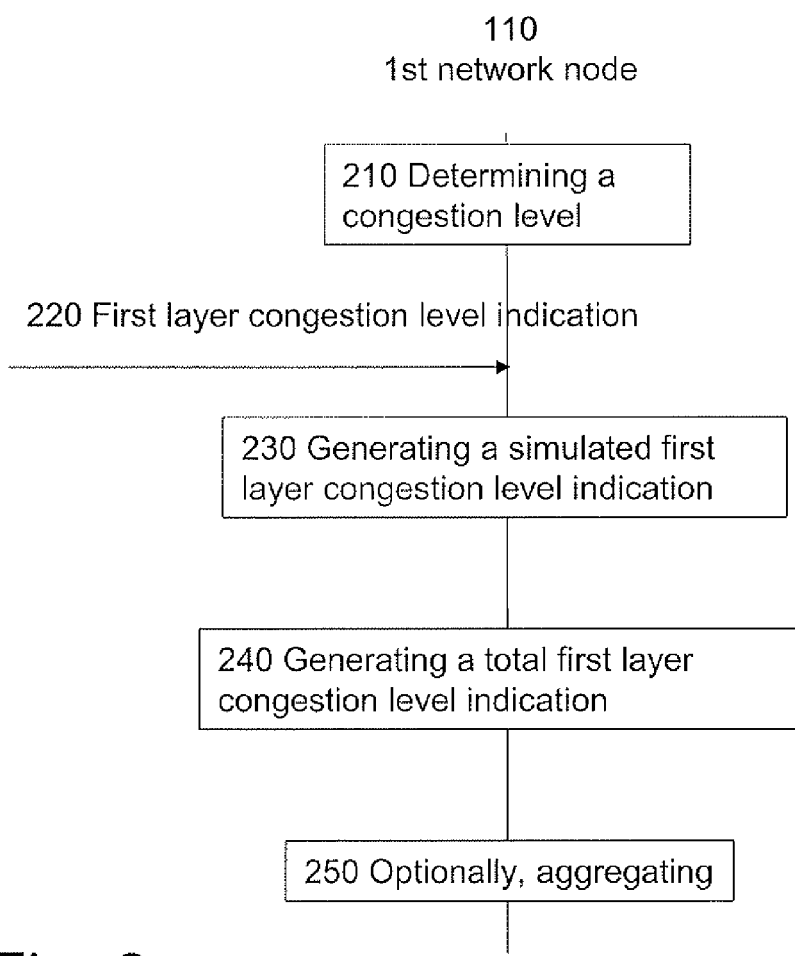
FIG. 2 shows a schematic, combined signalling and flow chart of an exemplifying embodiment of the method in the first network node according to the present invention.

With reference to FIG. 2, there is shown a schematic, combined signalling and flow chart of an exemplifying embodiment of the method in the first network node according to the present invention. The following steps may be performed in the first network node 110. Notably, the order of the steps may differ from what is shown below for other embodiments of the method in the first network node.

210 The network node 110 determines 210 a congestion level between the first and second layers based on, for example, the number of outstanding messages.

220 The first layer sends 220, to the network node 110, any existing first layer congestion level indication, indicating congestion between the first layer of the first network node and the first layer of the second network node. Any existing first layer congestion level indication shall be understood to indicate whether there is any first layer congestion level indication. Such first layer congestion level indication is received from the first layer as an indication that there is congestion on said at least one link between the first layer of the first network node 110 and the first layer of the second network node 120. Then this will be taken into account, when generating the total first layer congestion level indication in step 240 below.

230 The network node 110 generates 230 a simulated first layer congestion level indication based on the determined congestion level between the first and second layers.

240 The network node 110 generates 240 a total first layer congestion level indication based on the simulated first layer congestion level indication and said any existing first layer congestion level indication. Expressed differently, the network node 110 generates 240 a total first layer congestion level indication based on the simulated first layer congestion level indication and any first layer congestion level indication if such has been received in the step 220. In this manner, sequence problems in case of congestion in both the interface between the first layers in the first and second network nodes, respectively and the interface between the first and second layers may be avoided.

250 Optionally, the network node 110 aggregates 250 the simulated first layer congestion level indication and said any existing first layer congestion level indication to form the total first layer congestion level indication.

260 Optionally, the second layer receives 260 from the interface the total first layer congestion level indication, if the steps above are performed in the interface.

270 Optionally, if the steps above are performed in the second layer, the second layer makes the total first layer congestion level indication available.

As a result, the second layer may be aware of overload situation, not only between first layers in the first and second network nodes 110, 120, respectively, but also about overload in the interaction between the first and second layers.

Figure 3:
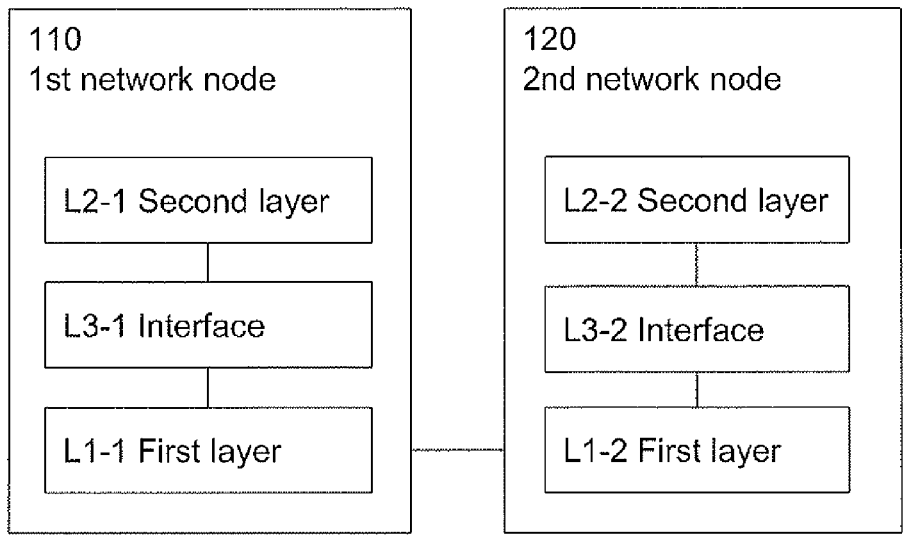
FIG. 3 shows a schematic block diagram of exemplifying layers and interfaces of the first and second network nodes.

FIG. 3 shows a schematic block diagram of exemplifying layers and interfaces of the first and second network nodes 110, 120. The first network node 110 comprises, in the telecommunications signalling network protocol stack implemented therein, a first layer L1-1, an interface L3-1 and a second layer L2-1. Communication between the first layer L1-1 of the first network node 110 and the second layer L2-1 of the first network node 110 is handled via the interface L3-1 of the first network node 110. Similarly, the second network node 120 comprises, in the telecommunications signalling network protocol stack implemented therein, a first layer L1-2, an interface L3-2 and a second layer L2-2. Communication between the first layer L1-2 of the second network node 120 and the second layer L2-2 of the second network node 120 is handled via the interface L3-2 of the second network node 120. Data leaving the first network node is passed from the second layer L2-1 to the first layer L1-1 via the interface L3-1. The data is then passed to the first layer L1-2 of the second network node 120 for further progressing to the second layer L2-2 of the second network node 120 via the interface L3-2 of the second network node 120.

Figure 4:
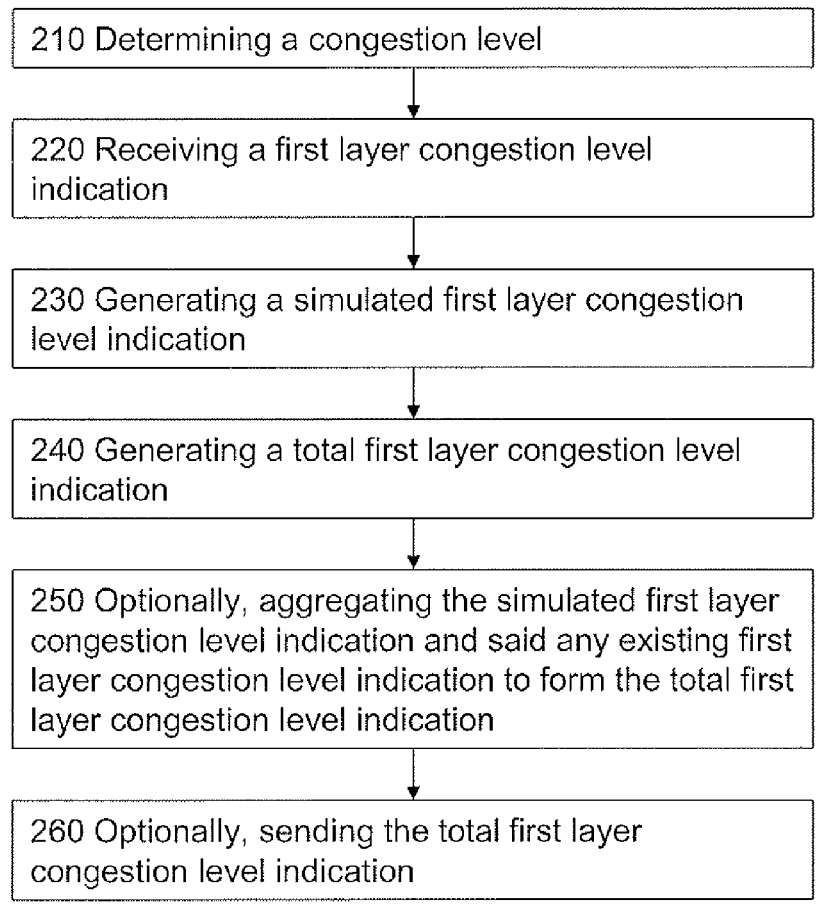
FIG. 4 shows a schematic flow chart of an embodiment of the method in the first network node.

In FIG. 4, there is shown a schematic flow chart of an embodiment of the method in the first network node 110 for managing congestion of outgoing data of at least one link in a telecommunications signalling network protocol stack, comprising a first and a second layer and an interface therebetween. Each said at least one link interconnects the first network node 110 and a second network node 120. The first network node 110 comprises multiple processing modules. A communication network 100 comprises the first and second network nodes 110, 120. First layer congestion level indication is based on congestion between the first layer of the first network node 110 and the first layer of the second network node 120. The following steps may be performed. Notably, the order of the steps may differ from what is shown below for some embodiments of the method.

210 The network node 110 determines 210 a congestion level between the first and second layers.

220 The network node 110 receives 220, from the first layer, any existing first layer congestion level indication, indicating congestion between the first layer of the first network node and the first layer of the second network node.

230 The network node 110 generates 230 a simulated first layer congestion level indication based on the congestion level.

240 The network node 110 generates 240 a total first layer congestion level indication based on the simulated first layer congestion level indication and said any existing first layer congestion level indication.

250 Optionally, the network node 110 aggregates 250 the simulated first layer congestion level indication and said any existing first layer congestion level indication to form the total first layer congestion level indication.

260 Optionally, if the steps above are performed in the interface, the interface sends 260 to the second layer the total first layer congestion level indication.

270 Optionally, if the steps above are performed in the second layer, the second layer makes the total first layer congestion level indication available.

In some embodiments of the method in the first network node 110, the method is performed in the interface. Preferably, the method further comprises a step of sending 260 to the second layer the total first layer congestion level indication.

In some embodiments of the method in the first network node 110, the method is performed in the second layer. Preferably, the method further comprises a step of making 270 the total first layer congestion level indication available to the second layer.

In embodiments of the method in the first network node 110, a higher layer comprises the interface and the second layer.

In some embodiments of the method in the first network node 110, the total first layer congestion level indication comprises the simulated first layer congestion level indication, if the simulated first layer congestion level indication indicates worse congestion than said any existing first layer congestion level indication, or said any existing first layer congestion level indication, if said any existing first layer congestion level indication indicates worse congestion than the simulated first layer congestion level indication. For example, the total first lay congestion level indication comprises the one of the simulated first layer congestion level indication and said any existing first layer congestion level indication that indicates the highest level of congestion. It is to be understood that the highest level of congestion indicates which of the simulated first layer congestion level indication and said any existing first layer congestion level indication is the most congested (or overloaded).

In some embodiments of the method in the first network node 110, the telecommunication signalling network protocol stack comprises an SS7 network protocol stack.

In some embodiments of the method in the first network node 110, the first layer comprises layer-2 of the SS7 network protocol stack, preferably layer-2 is one of MTP2, NNI-SAAL or SCTP.

In some embodiments of the method in the first network node 110, the second layer comprises layer-3 of the SS7 network protocol stack.

In some embodiments of the method in the first network node 110, the layer-3 is MTP3, when layer-2 is MTP2 or NNI-SAAL, or the layer-3 is M3UA, when layer-2 is SCTP.

In some embodiments of the method in the first network node 110, said first layer congestion indication comprises layer-2 congestion indication, when the second layer is MTP3 or MTP3b, or Send Failure Notification, when the second layer is M3UA.

Figure 5:
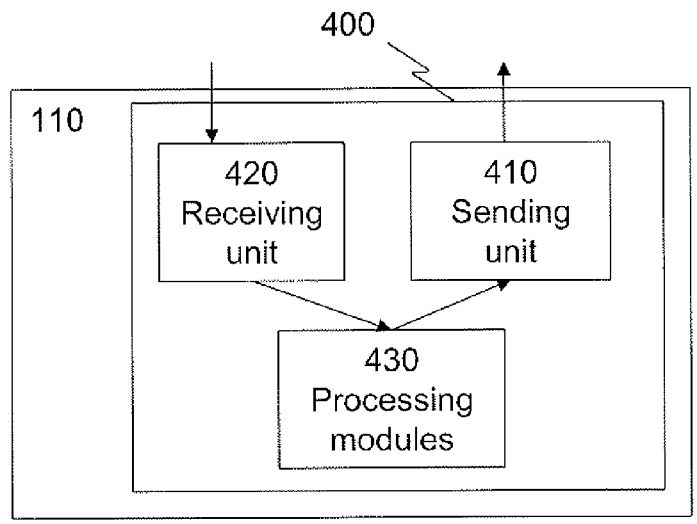
FIG. 5 shows a schematic block diagram of an embodiment of the arrangement in the first network node.

In FIG. 5, there is shown an exemplifying embodiment of an arrangement 400 in a first network node 110 for managing congestion of outgoing data of at least one link in a telecommunications signalling network protocol stack, comprising a first and a second layer and an interface therebetween. Each said at least one link interconnects the first network node 110 and a second network node 120. The first network node 110 comprises multiple processing modules 430. A communication network 100 comprises the first and second network nodes 110, 120. First layer congestion level indication is based on congestion between the first layer of the first network node 110 and the first layer of the second network node 120. Further, at least one of said multiple processing modules 430 is configured to determine a congestion level between the first and second layers. The arrangement 400 further comprises a receiving unit 420 configured to receive, from the first layer, any existing first layer congestion level indication, indicating congestion between the first layer of the first network node 110 and the first layer of the second network node 120. Moreover, said at least one of said multiple processing modules 430 is configured to generate a simulated first layer congestion level indication based on the congestion level between the first layer and second layers, and to generate a total first layer congestion level indication based on the simulated first layer congestion level indication and said any existing first layer congestion level indication.

In some embodiments of the arrangement 400 in the first network node 110, the arrangement 400 further comprises a sending unit 410 configured to send to the second layer the total first layer congestion level indication, if the interface is configured to perform the steps above.

In some embodiments of the arrangement 400 in the first network node 110, the second layer may be configured to perform the steps above. Preferably, said at least one of said multiple processing modules 430 is configured to make the total first layer congestion level indication available to the second layer.

In some embodiments of the arrangement 400 in the first network node 110, said at least one of said multiple processing modules 430 is configured to aggregate the simulated first layer congestion level indication and said any existing first layer congestion level indication to form the total first layer congestion level indication.

In some embodiments of the arrangement 400 in the first network node 110, the total first layer congestion level indication comprises the simulated first layer congestion level indication, if the simulated first layer congestion level indication indicates worse congestion than said any existing first layer congestion level indication, or said any existing first layer congestion level indication, if said any existing first layer congestion level indication indicates worse congestion than the simulated first layer congestion level indication. For example, the total first lay congestion level indication comprises the one of the simulated first layer congestion level indication and said any existing first layer congestion level indication that indicates the highest level of congestion. It is to be understood that the highest level of congestion indicates which of the simulated first layer congestion level indication and said any existing first layer congestion level indication is the most congested (or overloaded).

In some embodiments of the arrangement 400 in the first network node 110, the telecommunication signalling network protocol stack comprises an SS7 implementation.

In some embodiments of the arrangement 400 in the first network node 110, the first layer comprises layer-2, preferably layer-2 is one of MTP2, NNI-SAAL or SCTP.

In some embodiments of the arrangement 400 in the first network node 110, the second layer comprises layer-3.

In some embodiments of the arrangement 400 in the first network node 110, the layer-3 is MTP3, when layer-2 is MTP2 or NNI-SAAL, or the layer-3 is M3UA, when layer-2 is SCTP.

In some embodiments of the arrangement 400 in the first network node 110, said first layer congestion indication comprises layer-2 congestion indication, when the second layer is MTP3 or MTP3b, or Send Failure Notification, when the second layer is M3UA.

Figure 6:
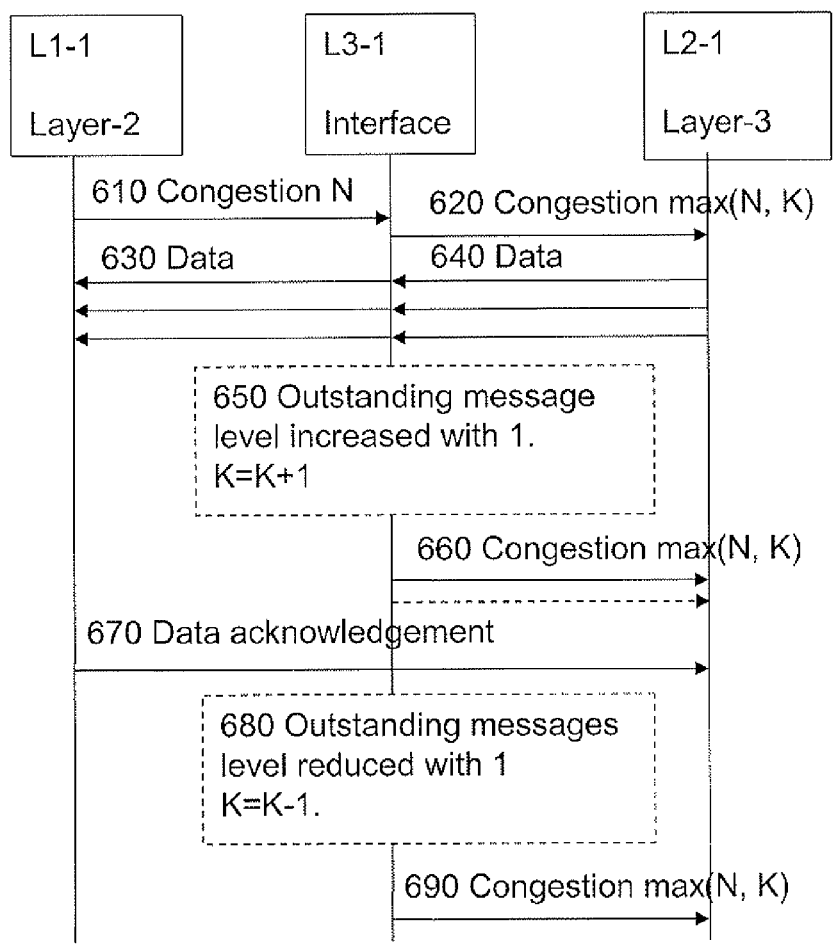
FIG. 6 shows a schematic, exemplifying combined signalling and flow chart of an embodiment of the method in the first network node.

FIG. 6 shows a first exemplifying, schematic combined signalling and flow chart of an embodiment of the method in the first network node 110 for managing congestion of at least one link in a SS7 network protocol stack, comprising a layer-2, denoted L1-1, and a layer-3, denoted L2-1, and an interface, denoted L3-1, therebetween. The first network node 110 comprises multiple processing modules. The layer-2 is MTP2 or NNI-SAAL. The layer-3 is MTP3. Said at least one link interconnects the first network node 110 with a second network node 120. Flow control for all internal interfaces, per each said at least one link independently, may be based on a congestion mechanism. The principle of the congestion mechanism is that separate flow control for each said at least one link is provided in order to regulate (or control) outgoing data by means of congestion indications only for those links that carry high amount of data. At the same time, it is desired to avoid raising congestion indications for other links of the particular overloaded layer-2 instance, i.e. overload between layer-2-layer-2. Some links may not carry data at all at the moment of layer-2 instance overload, so it is inappropriate to mark them as congested. The principle is the same for all types of links, such as MTP2 NB, MTP2 HSL and NNI-SAAL. Three levels of congestions are introduced to handle overload, where zero (0) indicates no congestion and 1-3 indicate three different levels of congestion. N denotes the congestion level for congestion between layer-2 in the first network node and layer-2 in the second network node (see FIG. 3) for each said at least one link. K denotes the congestion level for congestion between layer-2 and layer-3 in the first network node, also referred to as internal congestion, for each said at least one link. N and K may hence assume any of the values 0, 1, 2 or 3. The dotted lines may indicate the steps introduced in this example. The following steps may be performed. Notably, the order of the steps may differ from what is shown below for some embodiments of the method.

610 The interface L3-1 receives 610 congestion level N from the layer-2. The interface may receive such congestion level N at any time.

620 The interface L3-1 sends 620 the maximum congestion level of N and K.

630, 640 The interface L3-1 passes 630, 640 data from the layer-3 L2-1 to the layer-2 L1-1 640.

650 The interface L3-1 increments 650 the counter K with 1 if the numbers of non-acknowledged messages are above a certain threshold. In this manner, internal congestion is simulated. Advantageously, the layer-3 L2-1 may be aware of overload situation, not only between layer-2 instances in the first and second network nodes 110, 120, respectively, but also of overload situation in the interaction between the layer-2 and the layer-3 (referred to as internal congestion) as indicated by the counter K.

660 The interface L3-1 sends 660 the maximum congestion level of N and K in order to report the congestion level to the layer-3. In this manner, MTP2/NNI-SAAL (layer-2) line congestion is simulated when the interface between MTP3 (layer-3) and layer-2 is overloaded. As a result, layer-2 line congestion indications has been aggregated with the simulated congestion for the interface overload to make a consistent view for layer-3, wherein layer-2 line congestion indications indicate congestion between layer-2 instances of the first and second network nodes 110, 120, respectively. For each link, the interface (between layer-3 and layer-2) may separately maintain the level of congestion that was indicated by layer-2 and the level of congestion based on the amount of not acknowledged messages towards layer-2. These two levels, i.e. N and K, may be tied in the interface in such a way that maximum of these two levels may be indicated to the layer-3. Optionally, it may not be necessary to send the maximum congestion level of N and K if there is no changed as compared to a previous report of the congestion level. Advantageously, sequence problems in case of congestion between layer-2 instances in the first and second network nodes 110, 120, respectively and in case of congestion between the layer-2 and the layer-3 in the first network node may be avoided.

670 The layer-2 L1-1 send a data acknowledgement message to the layer-3 L2-1 via the interface L3-1.

680 The interface L3-1 decrements the counter K due to the data acknowledgement message.

690 The interface L3-1 sends the maximum level of N and K.

Figure 7:
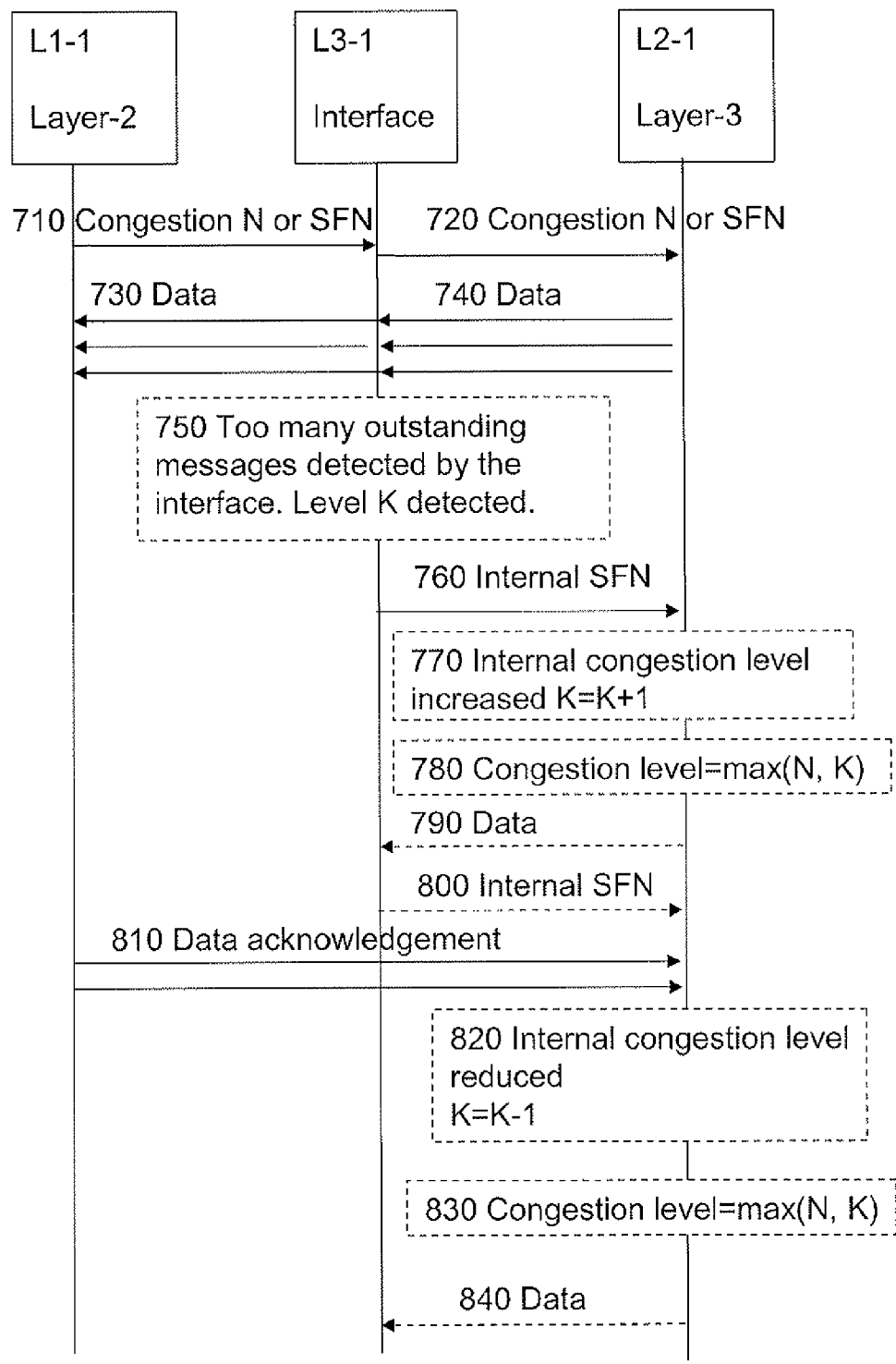
FIG. 7 shows a schematic, exemplifying combined signalling and flow chart of another embodiment of the method in the first network node.

FIG. 7 shows a second exemplifying, schematic combined signalling and flow chart of an embodiment of the method in the first network node 110 for managing congestion of at least one link in a SS7 network protocol stack. Said at least one link interconnects the first network node 110 with a second network node 120. The method provides flow control from M3UA to SCTP under SCTP overload. The SS7 network protocol stack comprises a layer-2, denoted L1-1, and a layer-3, denoted L2-1, and an interface, denoted L3-1, therebetween. The first network node 110 comprises multiple processing modules. The layer-3 may be M3UA. The layer-2 may be SCTP. In this example, the interface (between layer-3 and layer-2) does not for each link separately maintain the level of congestion that was indicated by layer-2 and the level of congestion based on the amount of not acknowledged messages towards layer-2. Therefore, the interface is only able to report about failure to send (SFN), and thus layer-3 needs to handle buffering. The number of buffered messages will be used to determine the number of non-acknowledged messages."

The dotted lines may indicate the steps introduced in this example. The following steps may be performed. Notably, the order of the steps may differ from what is shown below for some embodiments of the method.

710, 720 The interface L3-1 passes congestion level N or SFN (Send Failure Notification) from the layer-2 L1-1 to the layer-3 L2-1.

730, 740 The interface L3-1 passes data from the layer-3 L2-1 to the layer-2 L1-1.

750 The interface detects (or determines) that there are too many outstanding messages in relation to a certain threshold. Outstanding messages are messages that have not yet been acknowledged. A level K is detected. Advantageously, the layer-3 L2-1 may be aware of overload situation, not only between layer-2 instances in the first and second network nodes 110, 120, respectively, but also about overload in the interaction between the layer-2 and the layer-3.

760 The interface L3-1 sends an internal SFN. When SCTP is overloaded and the window between M3UA and SCTP becomes closed (see step 750), subsequent data from M3UA will be rejected by the interface using SFN (message will be sent internally by the interface to itself). Again, this is necessary because the interface L3-1 is not aware of which said at least one link exist(s), whereas the layer-3 L2-1 is aware which said at least one link exist(s).

770 The internal congestion level is increased. Right after reception of a first SFN for association, M3UA will buffer all subsequent data that should be sent over that particular association. Depending on the usage of the buffer for messages that can't be sent due to SCTP overload or interface overload, the M3UA internal congestion indications (similar to congestion between layer-2 and layer-3) will be raised (the higher usage of buffer, the higher level of congestion) to reduce data flow towards overloaded SCTP.

780 The congestion level is set to the maximum level of N and K.

790 The interface L3-1 receives data from the layer-3 L2-1. As soon as the window towards SCTP becomes opened (credits are received), M3UA will send all buffered messages (unless SFN received again), subsequently decreasing congestion level (see step 820) if it was raised because of buffering. 800 The interface L3-1 sends an internal SFN.

810 The layer-3 L2-1 receives data acknowledgement. 820 In response to the received data acknowledgement in the step 810, the internal congestion level is decremented, if number of buffered messages is below a certain threshold.

830 The congestion level is set to the maximum level of N and K. In this manner, sequence problems in case of congestion between layer-2 instances in the first and second network nodes 110, 120, respectively and in case of congestion between the layer-2 and the layer-3 in the first network node may be avoided. 840 The interface L3-1 receives data from the layer-3 L2-1

An advantage of the method illustrated in FIG. 7 is that data losses under SCTP overload may be decreased. A further advantage is that congestion perceived by the second layer remains consistent with existing second layer implementations.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a first network node for managing congestion of outgoing data of a link, wherein said link interconnects the first network node and a second network node, the first network node comprises a first protocol stack comprising a first layer, a second layer, and an interface between the first layer and the second layer, the second network node comprises a second protocol stack comprising a first layer, a second layer, and an interface between the first layer and the second layer, the method comprising:

determining a congestion level between the first and second layers of the first network node, receiving, from the first layer of the first network node, an existing first layer congestion level indication indicating congestion between the first layer of the first network node and the first layer of the second network node, generating a simulated first layer congestion level indication based on the determined congestion level between the first and the second layers of the first network node, and generating a total first layer congestion level indication based on the simulated first layer congestion level indication and said existing first layer congestion level indication.

2. The method according to claim 1, wherein the method is performed in the interface of the first network node and further comprises sending to the second layer of the first network node the total first layer congestion level indication.

3. The method according to claim 1, wherein the method is performed in the second layer of the first network node and further comprises a step of making the total first layer congestion level indication available to the second layer.

4. The method according to claim 1, wherein the step of generating a total first layer congestion level indication further comprises aggregating the simulated first layer congestion level indication and said any existing first layer congestion level indication to form the total first layer congestion level indication.

5. The method according to claim 1, wherein the total first layer congestion level indication comprises the simulated first layer congestion level indication, if the simulated first layer congestion level indication indicates worse congestion than said any existing first layer congestion level indication, or said any existing first layer congestion level indication, if said any existing first layer congestion level indication indicates worse congestion than the simulated first layer congestion level indication.

6. The method according to claim 1, wherein the first protocol stack comprises an SS7 network protocol stack.

7. The method according to claim 6, wherein the first layer of the first network node comprises layer-2 of the SS7 network protocol stack.

8. The method according to claim 7, wherein the second layer of the first network node comprises layer-3 of the SS7 network protocol stack.

9. The method according to claim 8, wherein the layer-3 is MTP3, when layer-2 is MTP2 or NNI-SAAL, or the layer-3 is M3UA, when layer-2 is SCTP, 10. The method according to claim 6, wherein said first layer congestion indication comprises layer-2 congestion indication, when the second layer is MTP3 or MTP3b, or Send Failure Notification, when the second layer is M3UA.

11. The method of claim 1, wherein the first layer congestion level indicator is not assigned for links that are not overloaded.

12. The method of claim 1, wherein the network node generates a total first layer congestion level indication based on the simulated first layer congestion level indication and said any existing first layer congestion level indication.

13. The method of claim 12, wherein the interface sends the total first layer congestion level indication to the second layer based on one or more steps of the method being performed in the interface.

14. The method of claim 1, wherein the determined congestion level is a simulated congested level, generated by the interface, of not acknowledged messages to the second layer of the first network node.

15. The method of claim 1, wherein the determined congestion level is based on a number of not-acknowledged messages that exceed a threshold.

16. The method of claim 1, wherein the first layer congestion level indicator is indicating congestion on a link that is congested between the first network node and the second network node.

17. An arrangement in a first network node for managing congestion of outgoing data of at least one link in a telecommunications signalling network protocol stack, comprising a first and a second layer and an interface therebetween, wherein each said at least one link interconnects the first network node and a second network node, the first network node comprises multiple processing modules, wherein at least one of said multiple processing modules is configured to determine a congestion level between the first and second layers, characterized in that the arrangement further comprises:
 a receiving unit configured to receive, from the first layer, an existing first layer congestion level indication indicating congestion between the first layer of the first network node and the first layer of the second network node, wherein said at least one of said multiple processing modules further is configured to generate a simulated first layer congestion level indication based on the determined congestion level between the first and the second layers, and to generate a total first layer congestion level indication based on the simulated first layer congestion level indication and said existing first layer congestion level indication.

18. The arrangement of claim 17, wherein the network node generates a total first layer congestion level indication based on the simulated first layer congestion level indication and said any existing first layer congestion level indication.

* * * * *